US010414209B2

(12) United States Patent
Benzing, II

(10) Patent No.: US 10,414,209 B2
(45) **Date of Patent: *Sep. 17, 2019**

(54) NON-PNEUMATIC TIRE WITH GEODESIC PLY AND BEAD

(71) Applicant: The Goodyear Tire & Rubber Company, Akron, OH (US)

(72) Inventor: James Alfred Benzing, II, Canton, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 96 days.

This patent is subject to a terminal disclaimer.

(21) Appl. No.: 15/376,720

(22) Filed: Dec. 13, 2016

(65) Prior Publication Data

US 2017/0174004 A1 Jun. 22, 2017

Related U.S. Application Data

(60) Provisional application No. 62/270,856, filed on Dec. 22, 2015.

(51) Int. Cl.

*B60C 7/10* (2006.01)
*B60C 7/00* (2006.01)
*B60C 7/14* (2006.01)

(52) U.S. Cl.

CPC ................ *B60C 7/102* (2013.01); *B60C 7/00* (2013.01); *B60C 7/14* (2013.01); *B60C 2007/146* (2013.01)

(58) Field of Classification Search

CPC .. B60C 7/102; B60C 7/00; B60C 7/14; B60C 2007/146

USPC .............................................................. 152/5

See application file for complete search history.

(56) References Cited

U.S. PATENT DOCUMENTS 1,016,991 A * 2/1912 Herold ...................... B60C 7/14 152/268
6,068,721 A * 5/2000 Dyer ...................... B29D 30/36 152/554
6,386,258 B1 * 5/2002 Dyer ......................... B60C 9/07 152/542
6,640,859 B1 * 11/2003 Laurent ..................... B60C 7/10 152/246
2004/0187996 A1 * 9/2004 Grah ......................... B60C 1/00 152/516

(Continued)

FOREIGN PATENT DOCUMENTS

FR 2844479 A1 3/2004
FR 2856635 A1 12/2004

(Continued)

OTHER PUBLICATIONS

European Search Report dated May 8, 2017 for Application Serial No. EP16203425.

*Primary Examiner* — S. Joseph Morano
*Assistant Examiner* — Jean W Charleston
(74) *Attorney, Agent, or Firm* — June E. Rickey

(57) ABSTRACT

A non-pneumatic tire is described which includes a ground contacting annular tread portion, a shear band, and a reinforcement structure positioned radially inward of the tread. The reinforcement structure is formed from a plurality of strips, wherein each strip has a first end located radially outward of the shear band and a second end secured to a bead, wherein the plurality of strips do not extend completely across the annular tread portion.

10 Claims, 11 Drawing Sheets

100
400

(56) References Cited

U.S. PATENT DOCUMENTS

| | | | | |
|---|---|---|---|---|
| 2009/0022921 | A1* | 1/2009 | Meraldi | B29C 70/32 428/36.4 |

FOREIGN PATENT DOCUMENTS

| | | | |
|---|---|---|---|
| GB | 339403 | A | 12/1930 |
| WO | 02083435 | A1 | 10/2002 |

* cited by examiner $k = \frac{F}{\delta}$

Force (F)

Spring Rate K

Displacement (δ)

NON-PNEUMATIC TIRE WITH GEODESIC PLY AND BEAD

FIELD OF THE INVENTION

The present invention relates generally to vehicle tires and non-pneumatic tires, and more particularly, to a non-pneumatic tire.

BACKGROUND OF THE INVENTION

The pneumatic tire has been the solution of choice for vehicular mobility for over a century. The pneumatic tire is a tensile structure. The pneumatic tire has at least four characteristics that make the pneumatic tire so dominate today. Pneumatic tires are efficient at carrying loads, because all of the tire structure is involved in carrying the load. Pneumatic tires are also desirable because they have low contact pressure, resulting in lower wear on roads due to the distribution of the load of the vehicle. Pneumatic tires also have low stiffness, which ensures a comfortable ride in a vehicle. The primary drawback to a pneumatic tire is that it requires compressed fluid. A conventional pneumatic tire is rendered useless after a complete loss of inflation pressure.

A tire designed to operate without inflation pressure may eliminate many of the problems and compromises associated with a pneumatic tire. Neither pressure maintenance nor pressure monitoring is required. Structurally supported tires such as solid tires or other elastomeric structures to date have not provided the levels of performance required from a conventional pneumatic tire. A structurally supported tire solution that delivers pneumatic tire-like performance would be a desirous improvement.

Non-pneumatic tires are typically defined by their load carrying efficiency. "Bottom loaders" are essentially rigid structures that carry a majority of the load in the portion of the structure below the hub. "Top loaders" are designed so that all of the structure is involved in carrying the load. Top loaders thus have a higher load carrying efficiency than bottom loaders, allowing a design that has less mass.

Thus an improved non-pneumatic tire is desired that has all the features of the pneumatic tires without the drawback of the need for air inflation is desired.

BRIEF DESCRIPTION OF THE DRAWINGS

The present invention will be better understood through reference to the following description and the appended drawings, in which:

FIG. 11*a* illustrates a spring rate test for a shear band, while FIG. 11*b* illustrates the spring rate k determined from the slope of the force displacement curve.

DEFINITIONS

Figure 1:
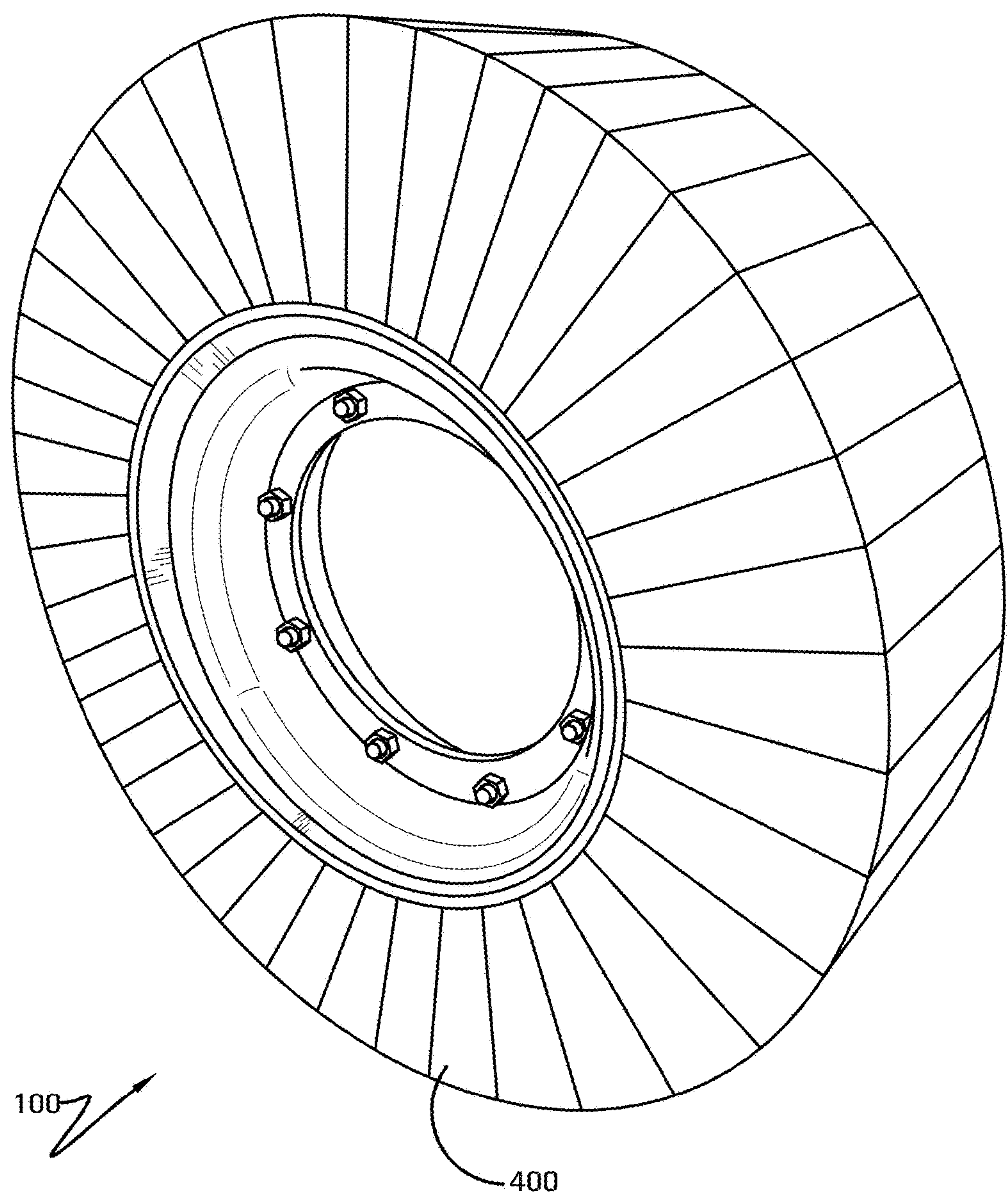
FIG. 1 is a perspective view of a first embodiment of a non-pneumatic tire of the present invention.

The following terms are defined as follows for this description.

"Equatorial Plane" means a plane perpendicular to the axis of rotation of the tire passing through the centerline of the tire.

"Meridian Plane" means a plane parallel to the axis of rotation of the tire and extending radially outward from said axis.

"Hysteresis" means the dynamic loss tangent measured at 10 percent dynamic shear strain and at 25° C.

DETAILED DESCRIPTION OF THE INVENTION

A non-pneumatic tire 100 of the present invention is shown in the enclosed figures. The non-pneumatic tire of the present invention includes a radially outer ground engaging tread 200, a shear band 300, and one or more reinforcement layer 400. The non-pneumatic tire of the present invention is designed to be a top loaded structure, so that the shear band 300 and the reinforcement layer 400 efficiently carries the load. The shear band 300 and the reinforcement layer 400 are designed so that the stiffness of the shear band is directly related to the spring rate of the tire. The reinforcement layer is designed to be a stiff structure that buckles or deforms in the tire footprint and does not compress or carry a compressive load. This allows the rest of structure not in the footprint area the ability to carry the load, resulting in a very load efficient structure. It is desired to minimize this load for the reason above and to allow the shearband to bend to overcome road obstacles. The approximate load distribution is such that approximately 95-100% of the load is carried by the shear band and the upper radial portion of the reinforcement layer 400, so that the lower portion of the reinforcement structure undergoing compression carries virtually zero of the load, and preferably less than 10%.

The tread portion 200 may be a conventional tread as desired, and may include grooves or a plurality of longitudinally oriented tread grooves forming essentially longitudinal tread ribs there between. Ribs may be further divided transversely or longitudinally to form a tread pattern adapted to the usage requirements of the particular vehicle application. Tread grooves may have any depth consistent with the intended use of the tire. The tire tread 200 may include elements such as ribs, blocks, lugs, grooves, and sipes as desired to improve the performance of the tire in various conditions.

Shear Band

Figure 4:
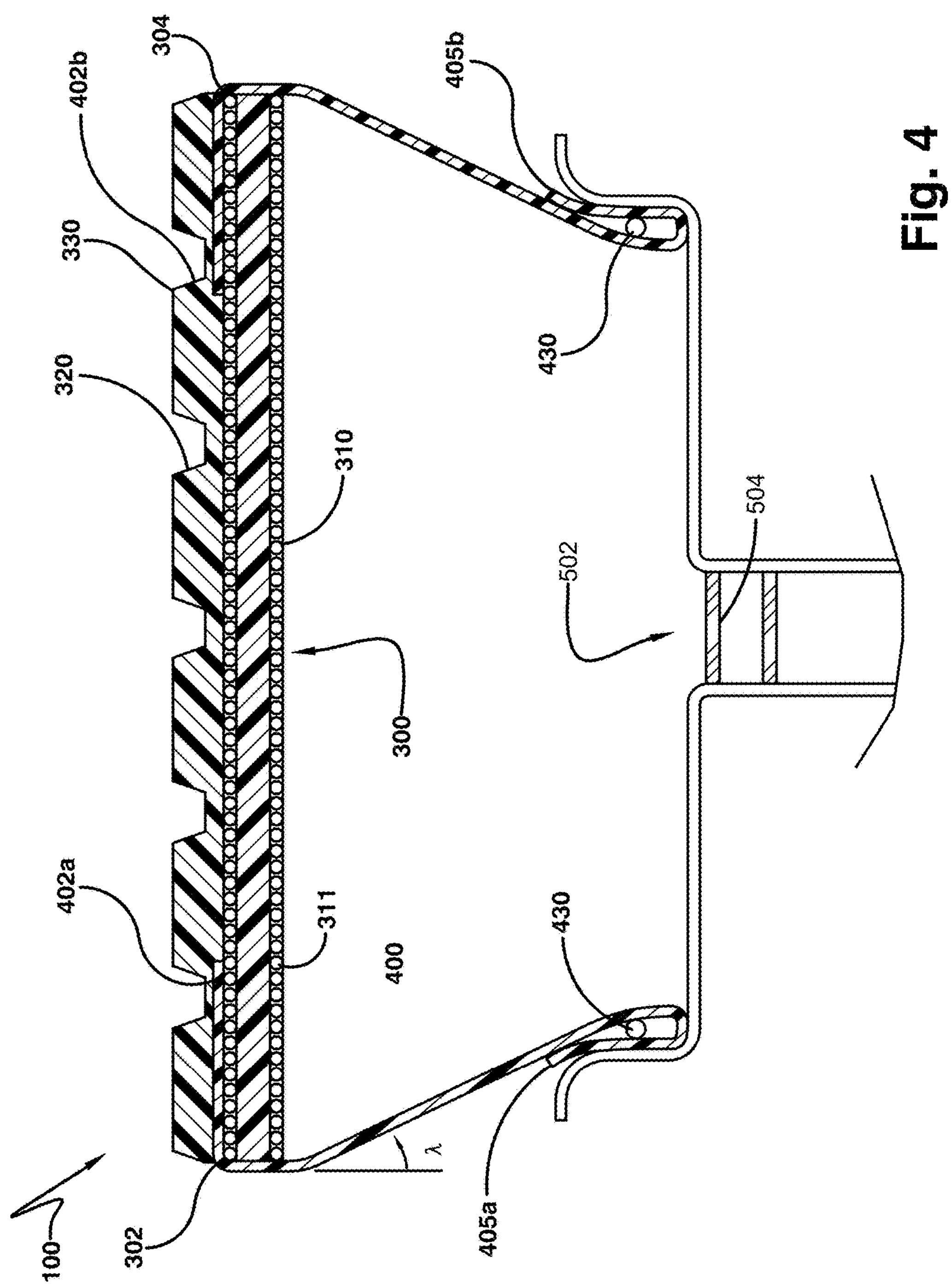
FIG. 4 is a cross-sectional view of the non-pneumatic tire of FIG. 1.

The shear band 300 is preferably annular. A cross-sectional view of the shear band is shown in FIG. 4. The shear band 300 is located radially inward of the tire tread 200. The shear band 300 includes a first and second reinforced elastomer layer 310,320. In a first embodiment of a shear band 300, the shear band is comprised of two inextensible reinforcement layers 310,320 arranged in parallel, and separated by a shear matrix 330 of elastomer. Each inextensible layer 310,320 may be formed of parallel inextensible reinforcement cords 311,321 embedded in an elastomeric coating. The reinforcement cords 311,321 may be steel, aramid, nylon, polyester or other inextensible structure. The shear band 300 may further optionally include a third reinforced elastomer layer 340 (not shown) located between the first and second reinforced elastomer layers 310,320.

It is additionally preferred that the outer lateral ends 302,304 of the shear band be radiused in order to control the buckled shape of the sidewall and to reduce flexural stresses.

In the first reinforced elastomer layer 310, the reinforcement cords are oriented at an angle Φ in the range of 0 to about +/−10 degrees relative to the tire equatorial plane. In the second reinforced elastomer layer 320, the reinforcement cords are oriented at an angle φ in the range of 0 to about +/−10 degrees relative to the tire equatorial plane. Preferably, the angle Φ of the first layer is in the opposite direction of the angle φ of the reinforcement cords in the second layer. That is, an angle +Φ in the first reinforced elastomeric layer and an angle −φ in the second reinforced elastomeric layer.

The shear matrix 330 has a radial thickness in the range of about 0.10 inches to about 0.2 inches, more preferably about 0.15 inches. The shear matrix is preferably formed of an elastomer material having a shear modulus $G_m$ in the range of 15 to 80 MPa, and more preferably in the range of 40 to 60 MPA.

The shear band has a shear stiffness GA. The shear stiffness GA may be determined by measuring the deflection on a representative test specimen taken from the shear band. The upper surface of the test specimen is subjected to a lateral force F as shown below. The test specimen is a representative sample taken from the shear matrix material, having the same radial thickness.

The shear stiffness GA is then calculated from the following equation:

$$GA=F*L/\Delta X$$

The shear band has a bending stiffness EI. The bending stiffness EI may be determined from beam mechanics using the three point bending test subjected to a test specimen representative of the shear band. It represents the case of a beam resting on two roller supports and subjected to a concentrated load applied in the middle of the beam. The bending stiffness EI is determined from the following equation: $EI=PL^3/48*\Delta X$, where P is the load, L is the beam length, and ΔX is the deflection.

It is desirable to maximize the bending stiffness of the shearband EI and minimize the shear band stiffness GA. The acceptable ratio of GA/EI would be between 0.01 and 20, with a preferred range between 0.01 and 5. EA is the extensible stiffness of the shear band, and it is determined experimentally by applying a tensile force and measuring the change in length. The ratio of the EA to EI of the shearband is acceptable in the range of 0.02 to 100 with a preferred range of 1 to 50. The shear band 300 preferably can withstand a maximum shear strain in the range of 15-30%.

Figures 11A, 11B:
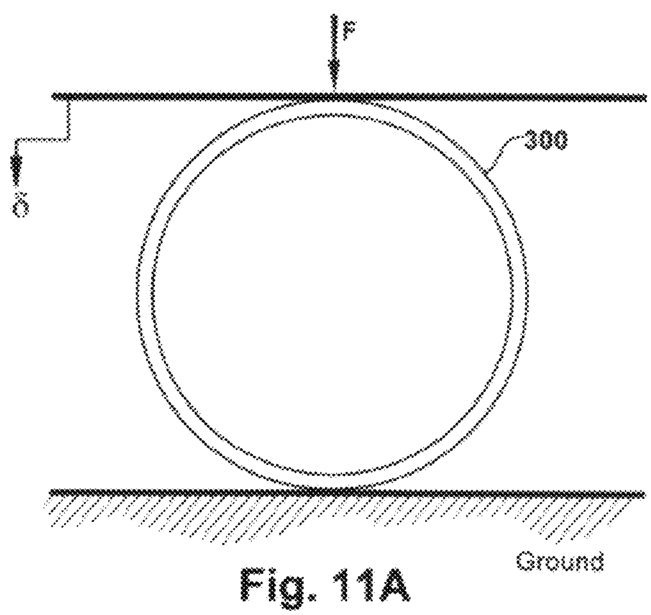
Figure 12:
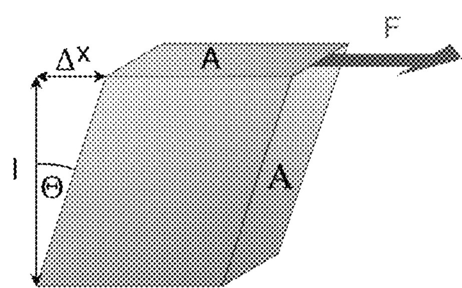
FIG. 12 is the deflection measurement on a shear band from a force F.

The shear band 300 has a spring rate k that may be determined experimentally by exerting a downward force on a horizontal plate at the top of the shear band and measuring the amount of deflection as shown in FIG. 11*a*. The spring rate k is determined from the slope of the Force versus deflection curve, as shown in FIG. 11*b*.

The non-pneumatic tire has an overall spring rate $k_t$ that is determined experimentally. The non-pneumatic tire is mounted upon a rim, and a load is applied to the center of the tire through the rim. The spring rate $k_t$ is determined from the slope of the Force versus deflection curve. The spring rate $k_t$ is preferably in the range of 500 to 1000 for small low speed vehicles such as lawn mowers.

The invention is not limited to the shear band structure disclosed herein, and may comprise any structure which has a GA/EI in the range of 0.01 to 20, or a EA/EI ratio in the range of 0.02 to 100, or a spring rate $k_t$ in the range of 500 to 1000, as well as any combinations thereof. More preferably, the shear band has a GA/EI ratio of 0.01 to 5, or an EA/EI ratio of 1 to 50 and any subcombinations thereof. The tire tread is preferably wrapped about the shear band and is preferably integrally molded to the shear band.

Reinforcement Structure

Figure 2:
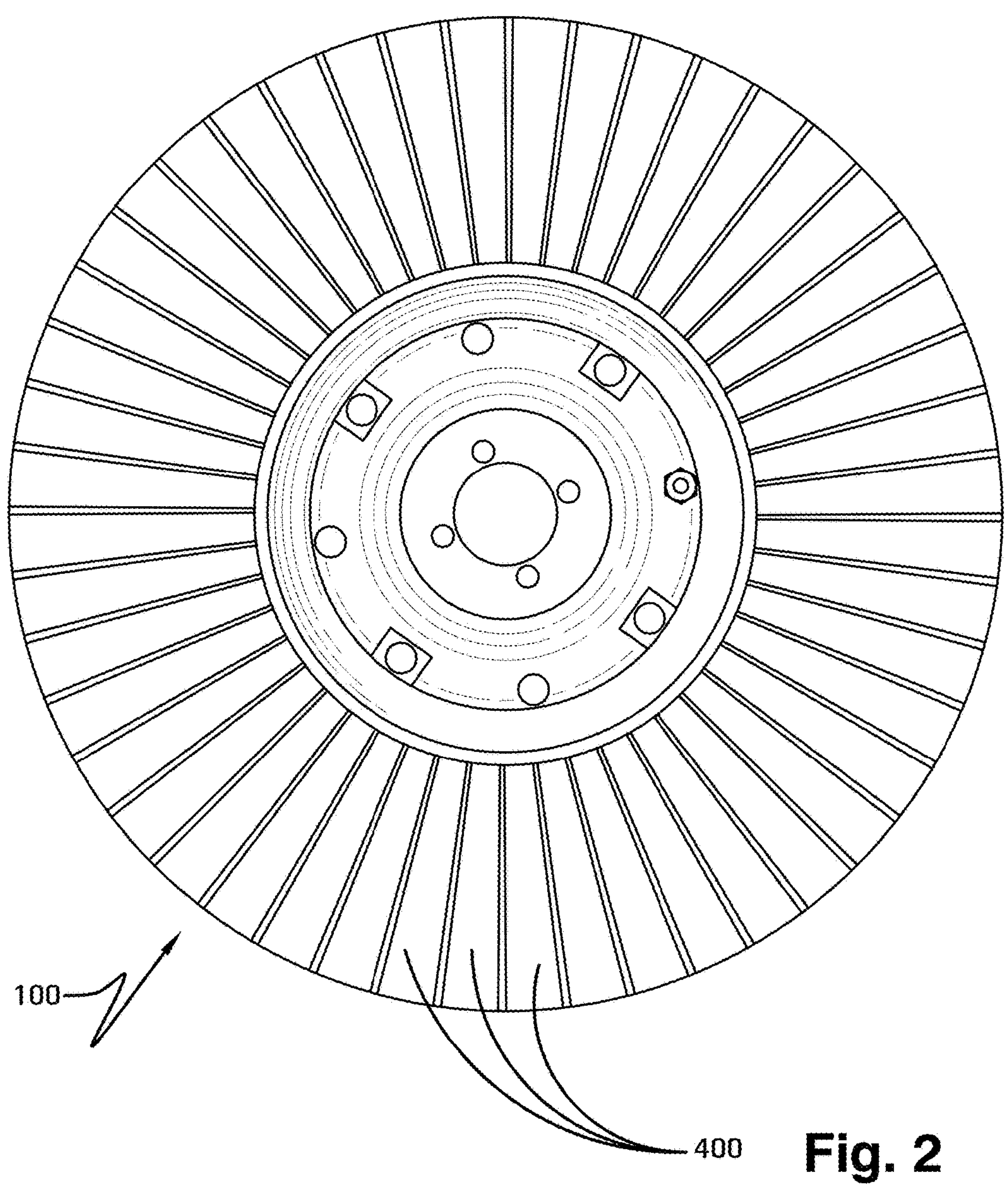
FIG. 2 is a side view of the non-pneumatic tire of FIG. 1.
Figure 3:
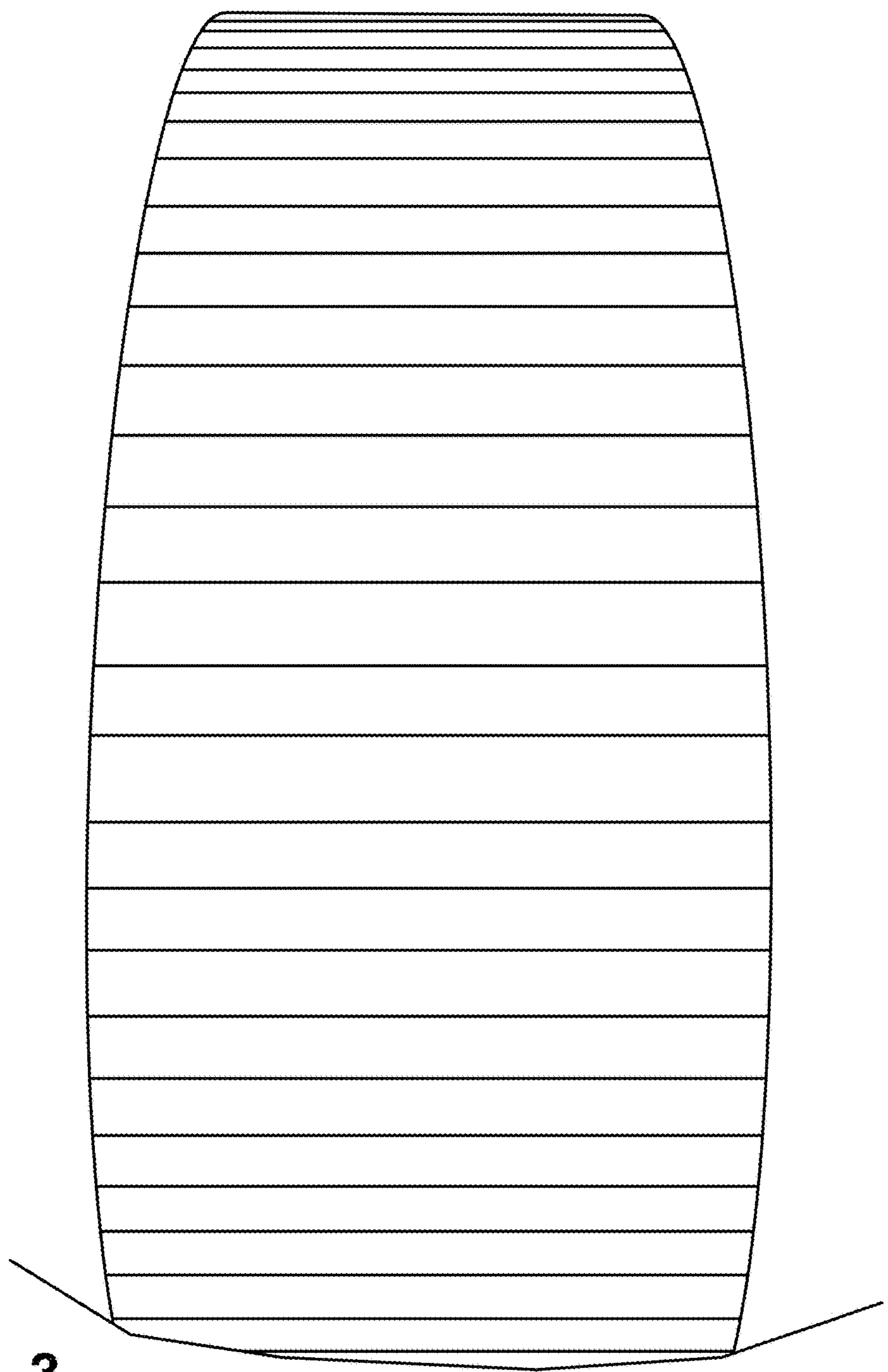
FIG. 3 is a top view of the non-pneumatic of FIG. 1.

A first embodiment of the non-pneumatic tire of the present invention is shown in FIG. 1-4. The reinforcement structure 400 functions to carry the load transmitted from the shear layer. The reinforcement structure 400 is primarily loaded in tension and shear, and carries no load in compression. As shown in FIGS. 1-2, the reinforcement structure is formed of a plurality of strips oriented in the radial direction. The strips may overlap. The reinforcement strips 400 may comprise any fabric or flexible structure such as nylon, polyester, cotton, rubber. Preferably, the reinforcement strips 400 comprise a reinforced rubber or ply strip formed of parallel reinforcements that are nylon, polyester or aramid. The reinforcement strips are preferably about 0.25 to 0.5 inches wide.

As shown in FIG. 4, each reinforcement strip 400 has a first end 402 *a,b* that is located radially outward of the shear band 300 and axially inward of the lateral edges 302,304 of the shear band. The first ends 402*a,b* may extend completely across the crown or not. The reinforcement strip 400 extends radially inward and wraps about a bead 430, terminating in a terminal end 405*a,b*. The bead 430 is an annular inextensible member, and made of conventional wire fabrics. The bead 430 is smaller than a bead used in a pneumatic tire for the same size. Thus the non-pneumatic tire is secured to a conventional tire rim known to those skilled in the art by a bead.

Preferably, the reinforced strips are oriented in the radial direction. It is preferred that tire ply be used as the reinforcement material for several reasons. First, tire ply is an ideal connecting structure for the non-pneumatic tire application because it is thin, and has a low bending stiffness with no resistance to compression or buckling. Tire ply has a high tensile stiffness and strength which is needed in the non-pneumatic tire application. Tire ply is also cheap, has a known durability, and is readily available.

As shown in FIG. 4, the reinforcement layer is preferably oriented so that it makes an angle alpha with respect to the radial direction. The angle alpha can help pretension the reinforcement 400 and also increase and tune the lateral stiffness of the tire. This results in a non-pneumatic tire having angled sidewalls. The angle alpha is measured with respect to the radial direction, and may be +/−40 degrees, and more preferably, +/−20 degrees. The angle alpha can be tuned as desired using an axial adjustment feature of the rim 502. The rim 502 may be axially adjusted to narrow or expand the axial rim width. This axial adjustment controls the ply tension, allowing the tire lateral stiffness to be adjusted independent of the radial stiffness. The rim may be adjusted by a tensioning member or bolt 504 that is mounted in the opposed rim parallel walls 506,508.

It is advantageous to locate the reinforcement layer radially outward of the shear band because it eliminates the tensile stress on the bond between the shear band and load carrying member or connecting structure. This advantage is especially important when the shear band and the play are dissimilar materials. The interface of the shear band and the connecting web is typically a point of failure due to the interface of dissimilar materials.

Figure 5:
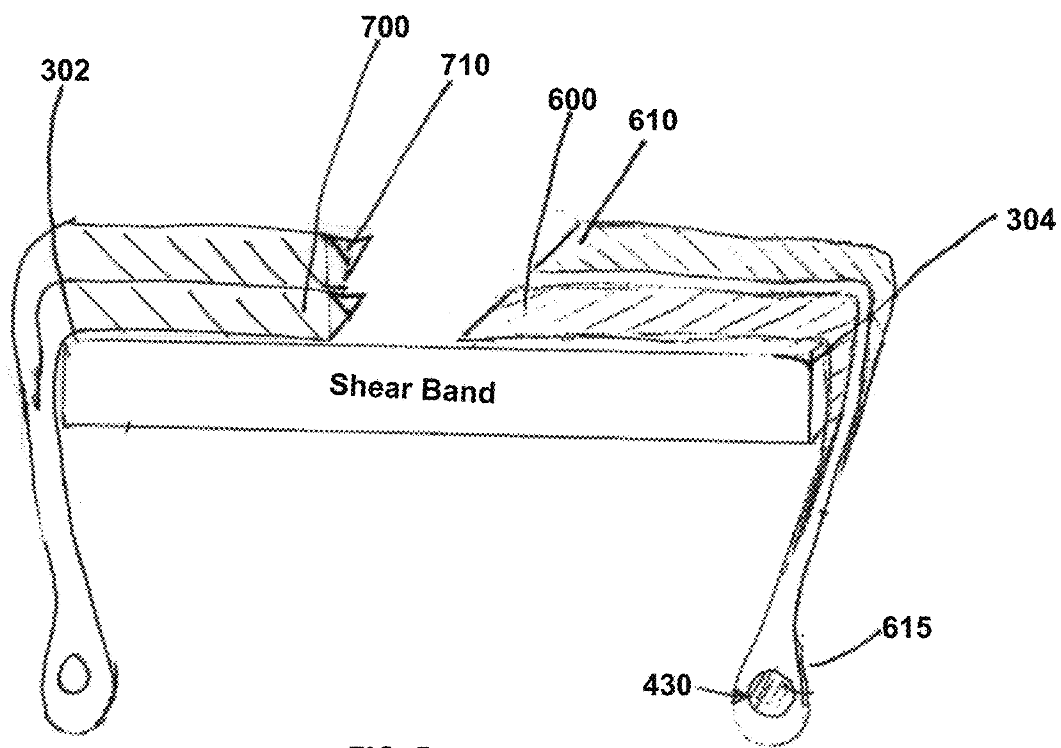
FIG. 5 is a first alternative embodiment of the geodesic ply spokes.

FIG. 5 illustrates an alternate embodiment of the ply spokes. The reinforcement layer is formed by looping 615 a plurality of strips about a respective bead 430, so that the first end 600 and the second end 610 are located adjacent each other. The first and second ends 600,610 are preferably located radially outward of the shear band or formed in the shear band. The strips are thus looped about the bead, forming a first sidewall. A plurality of strips are looped about a bead 430 on the other side of the tire to form a second sidewall. A first end 700 of a reinforced strip is looped around a bead 430 and then extended radially outward so that the second end 710 is mounted over the shear band and adjacent the first end 700. The first and second ends 600,610 of the first strip mounted on the right side of the tire may extend axially across the shear band to the left side 302 of the shear band. The first and second ends 700,710 mounted on the left side of the tire may also likewise extend axially across the shear band to the right side 304 of the shear band. The ends 700 may overlap with the strip ends 600. The ends 700 may overlap with the strip ends 600 in an alternating fashion.

Figure 6:
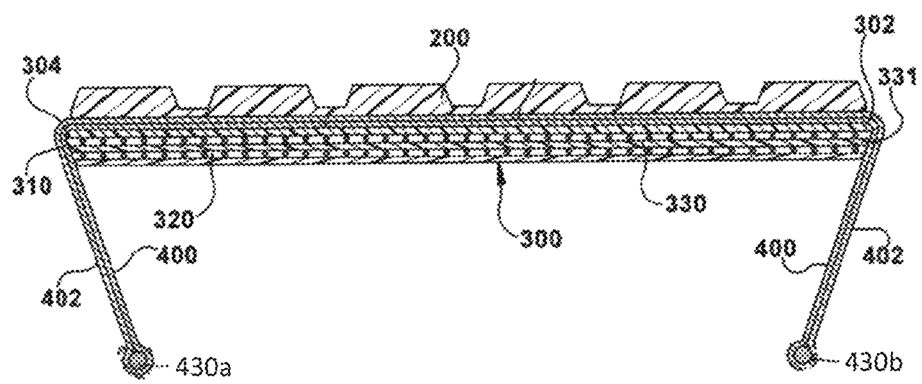
FIG. 6 is a second alternative embodiment of the geodesic ply spokes.

Alternatively, the reinforced ply strip may be continuously wound from one side of the tire to the other, forming a plurality of radial ply spokes as shown in FIG. 6. The reinforced strips are located radially outward of the shear band 300. The reinforced strip is wound about a first bead, in a continuous manner to the other bead and so forth, forming an endless ply. The ply spokes or strip are preloaded in tension.

The reinforcement structure 400 need not be positioned radially outward of the shear band. The reinforcement structure may be positioned radially inward and underneath the shear band (not shown).

Figure 7:
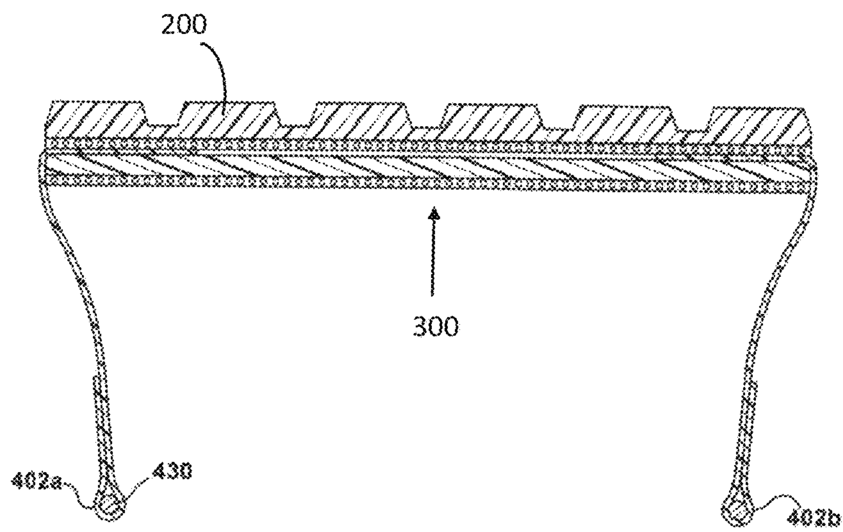
FIG. 7 is a cross-sectional view of a third embodiment of the invention.
Figure 8:
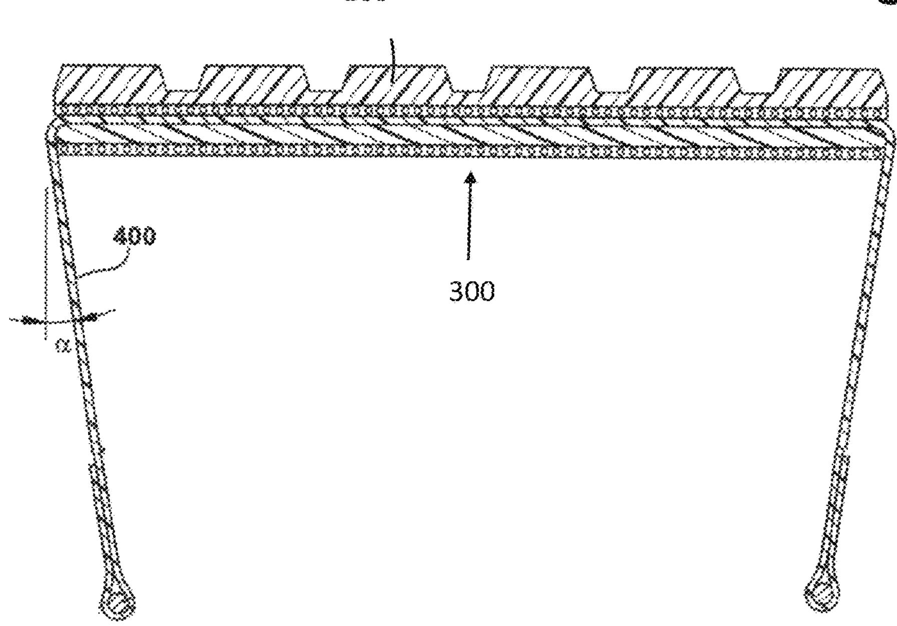
FIG. 8 is a cross-sectional view of a fourth embodiment of the invention.
Figure 9:
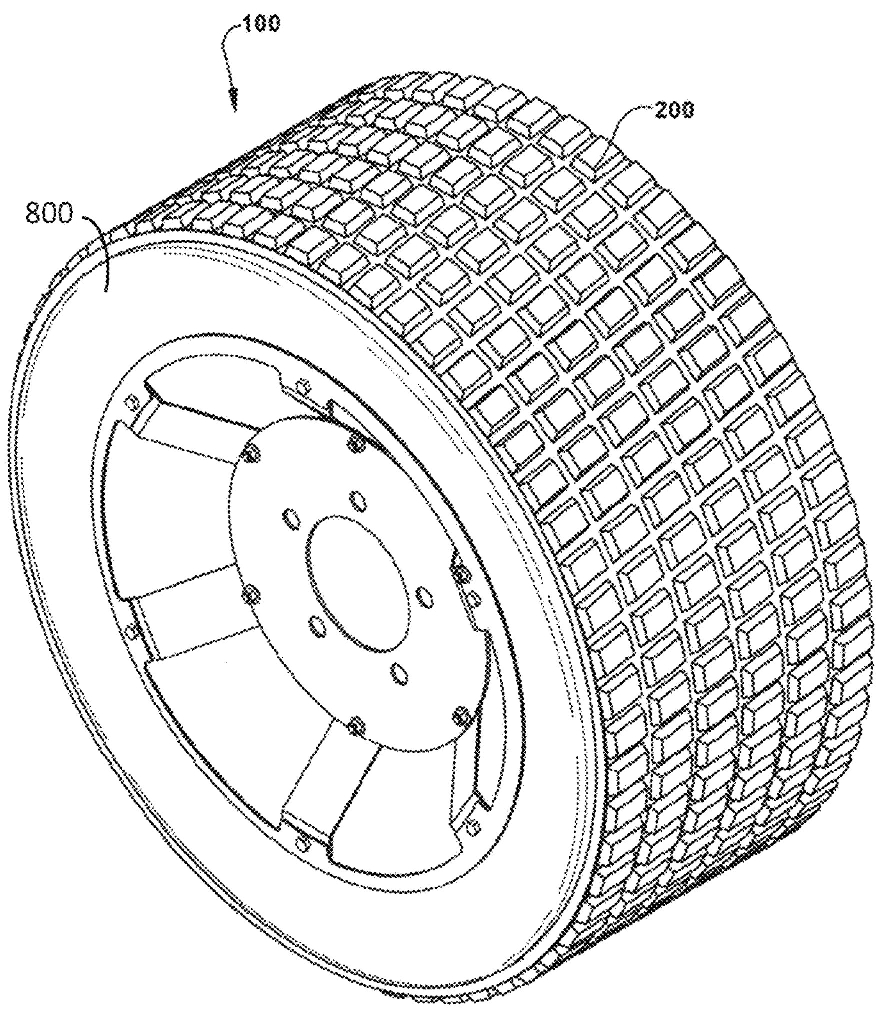
FIG. 9 is a perspective view of a fifth embodiment of the invention.
Figure 10:
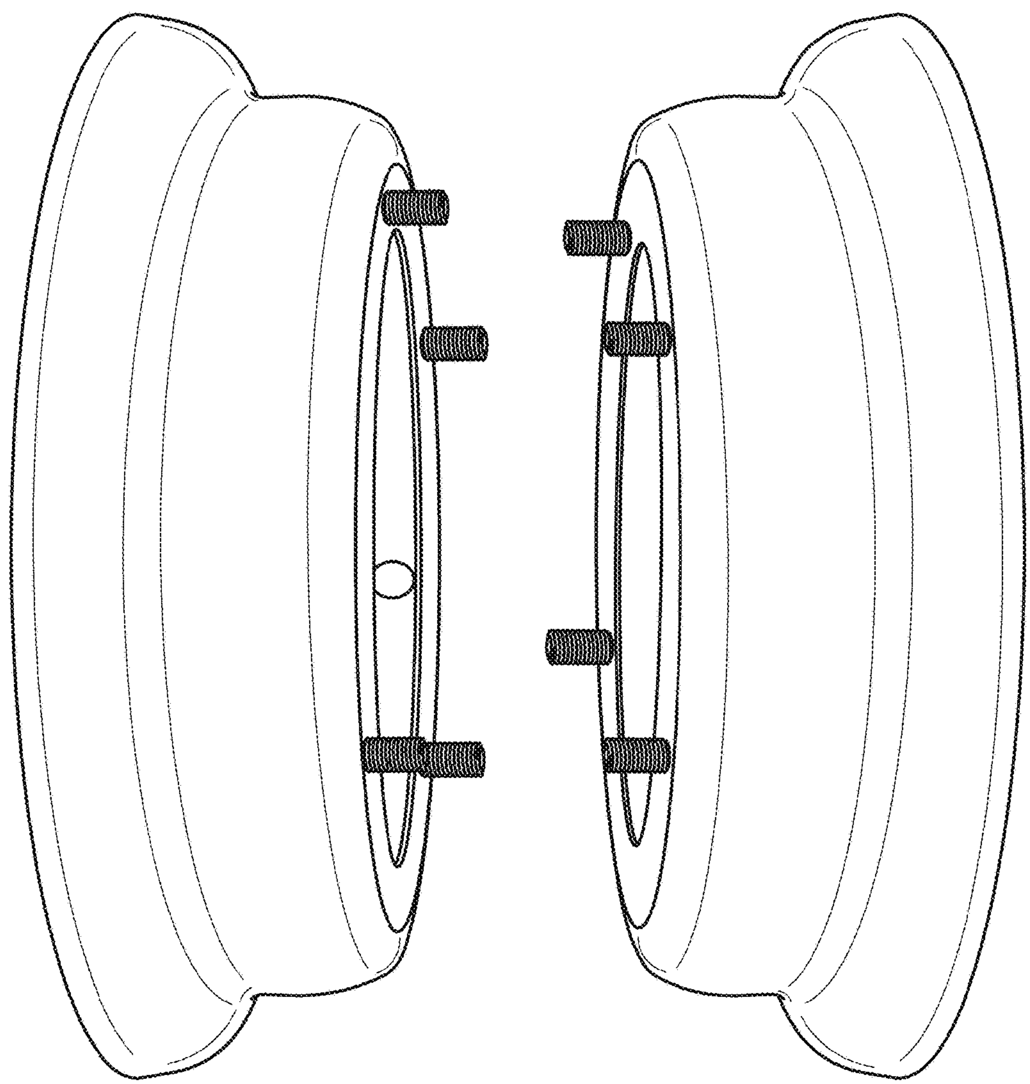
FIG. 10 is a side view of a two piece rim for use with the invention.

Alternatively, the first ends 402*a,b* of the reinforced strips 400 may be positioned between the reinforcement layers of the shear band, as shown in FIG. 7. The reinforced strips 400 may extend completely across the shear band in the axial direction as shown in FIG. 8. Furthermore, although the invention has been described as ply strips oriented to form spokes that extend in the radial direction, a layer of ply 800 as shown in FIG. 9 may be used to form any of the constructions described herein. Although the invention may be utilized with a conventional tire rim, the invention may also be used with a conventional tire rim split in half as shown in FIG. 10, which may provide for axial adjustment between the rims. Applicants understand that many other variations are apparent to one of ordinary skill in the art from a reading of the above specification. These variations and other variations are within the spirit and scope of the present invention as defined by the following appended claims.

What is claimed:

1. A non-pneumatic tire comprising
- a ground contacting annular tread portion;
- a shear band; and
- a reinforcement structure positioned radially inward of the tread, said reinforcement structure being formed from a plurality of strips, wherein each strip has a first end located radially outward of the shear band and a second end secured to a bead, wherein the plurality of strips do not extend completely across the annular tread portion.

2. The non-pneumatic tire of claim 1 wherein the reinforcement structure is a layer of ply.

3. The non-pneumatic tire of claim 1 wherein the reinforcement structure is a plurality of strips of material.

4. The non-pneumatic tire of claim 3 wherein the strips are reinforced with one or more parallel reinforcements.

5. The non-pneumatic tire of claim 1 wherein the reinforcement structure is angled inwardly.

6. The non-pneumatic tire of claim 1 wherein the strips are oriented in the radial direction forming ply spokes.

7. The non-pneumatic tire of claim 1 wherein the non-pneumatic tire is mounted on a standard rim.

8. The non-pneumatic tire of claim 1 wherein the non-pneumatic tire is mounted on a rim, wherein the rim is axially adjustable.

9. The structurally supported non-pneumatic tire of claim 4 wherein the angle alpha is in the range of −20 to +20 degrees.

10. A non-pneumatic tire comprising
- a ground contacting annular tread portion;
- a shear band; and
- a reinforcement structure positioned radially inward of the tread, said reinforcement structure being formed from a plurality of strips, wherein each strip has a first end located between the shear band and a second end secured to a bead, wherein the plurality of strips do not extend completely across the annular tread portion.

* * * * *